(12) United States Patent
Artwohl et al.

(10) Patent No.: US 10,039,390 B2
(45) Date of Patent: Aug. 7, 2018

(54) VACUUM INSULATED GLASS ASSEMBLY WITH HEATED COATING

(71) Applicant: ANTHONY, INC., Sylmar, CA (US)

(72) Inventors: Paul J. Artwohl, Stevensville, MI (US); Jeffery W. Nicholson, Palmdale, CA (US); Matthew Rolek, Sylmar, CA (US); Mark Sandnes, Sylmar, CA (US)

(73) Assignee: Anthony, Inc., Sylmar, CA (US)

( * ) Notice: Subject to any disclaimer, the term of this patent is extended or adjusted under 35 U.S.C. 154(b) by 0 days.

(21) Appl. No.: 15/362,552

(22) Filed: Nov. 28, 2016

(65) Prior Publication Data

US 2018/0146797 A1    May 31, 2018

(51) Int. Cl.
| | |
|---|---|
| B32B 3/00 | (2006.01) |
| A47F 3/04 | (2006.01) |
| E06B 3/66 | (2006.01) |
| E06B 3/663 | (2006.01) |
| E06B 7/28 | (2006.01) |

(52) U.S. Cl.
CPC ............ *A47F 3/0434* (2013.01); *E06B 3/663* (2013.01); *E06B 3/6612* (2013.01); *E06B 7/28* (2013.01)

(58) Field of Classification Search
CPC .... E06B 3/663; E06B 3/6612; E06B 3/66304; A47F 3/0434
See application file for complete search history.

(56) References Cited

U.S. PATENT DOCUMENTS

| | | | |
|---|---|---|---|
| 6,052,965 | A | 4/2000 | Florentin et al. |
| 6,071,575 | A | 6/2000 | Collins et al. |
| 6,336,984 | B1 | 1/2002 | Aggas |
| 8,613,161 | B2 | 12/2013 | Nicholson et al. |
| 9,498,072 | B2 | 11/2016 | Artwohl et al. |
| 2015/0223619 | A1 | 8/2015 | Artwohl et al. |
| 2016/0166085 | A1 | 6/2016 | Twohy |

FOREIGN PATENT DOCUMENTS

WO    WO9955204    11/1999

OTHER PUBLICATIONS

Engineered Glass Productions, "Thermique Heated Glass," Nov. 28, 2012, [retrieved on Jan. 4, 2017], https://web.archive.org/web/20121128084914/http://www.egpglass.com/products/thermique-heated-glass, 1 page.

*Primary Examiner* — Elizabeth E Mulvaney
(74) *Attorney, Agent, or Firm* — Fish & Richardson P.C.

(57) ABSTRACT

One aspect of the invention features a refrigerated display case door panel assembly. The panel assembly includes a vacuum-insulate glass (VIG) panel assembly, an additional pane of glass, and an electrically conductive coating disposed between the VIG panel assembly and the additional pane of glass. The VIG panel assembly includes two panes of glass bounding a sealed evacuated space between the panes. The additional pane of glass is laminated across one of the panes of glass of the VIG panel assembly to form a refrigerator side of the door. The electrically conductive coating extends across at least a majority of a viewing area of the door and is connected to an electrical conduit for electrically heating the coating to apply heat across the viewing area between the VIG panel assembly and the additional pane of glass.

20 Claims, 11 Drawing Sheets

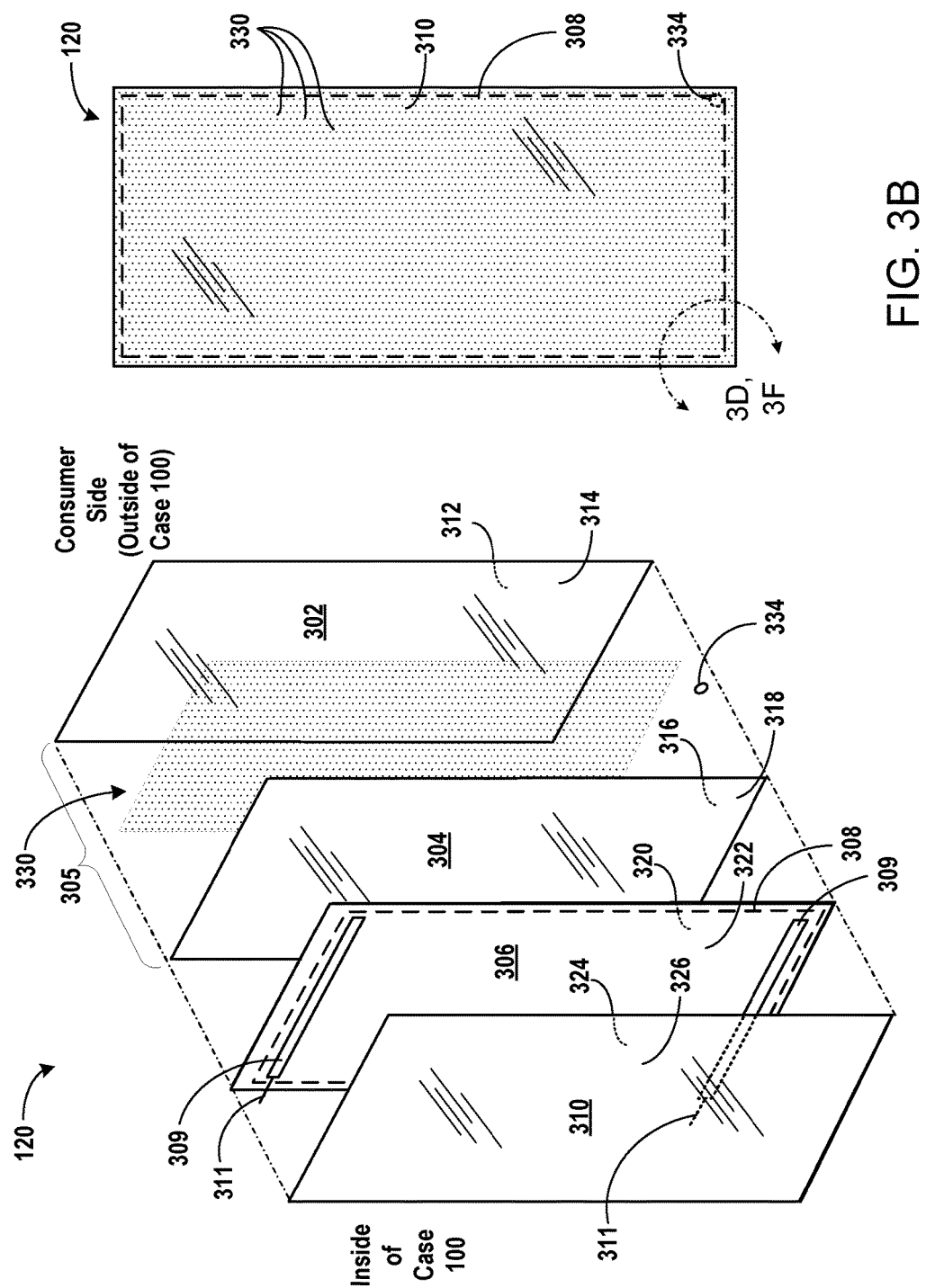

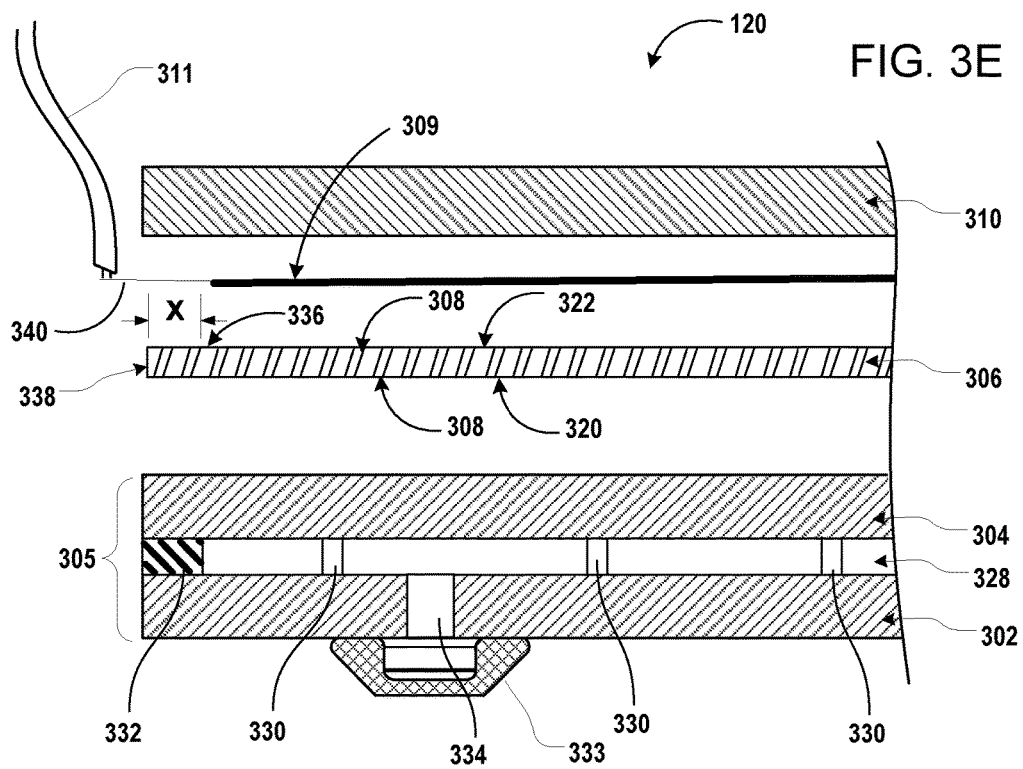
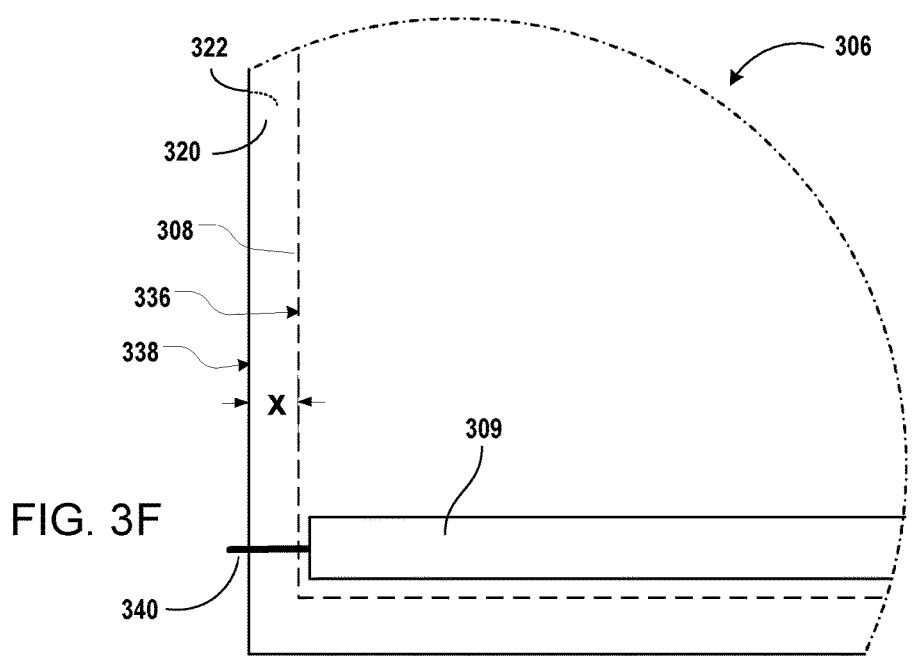

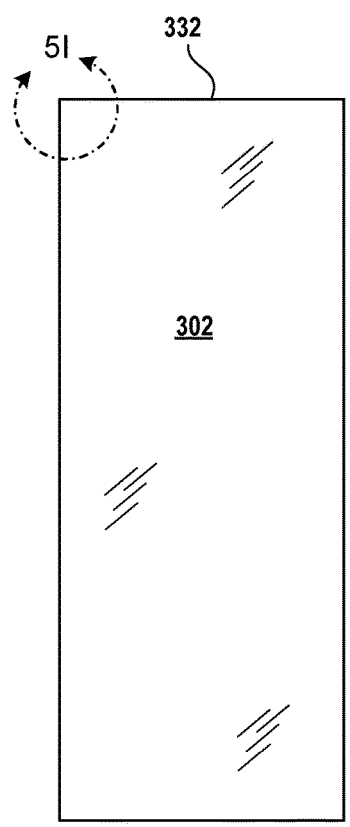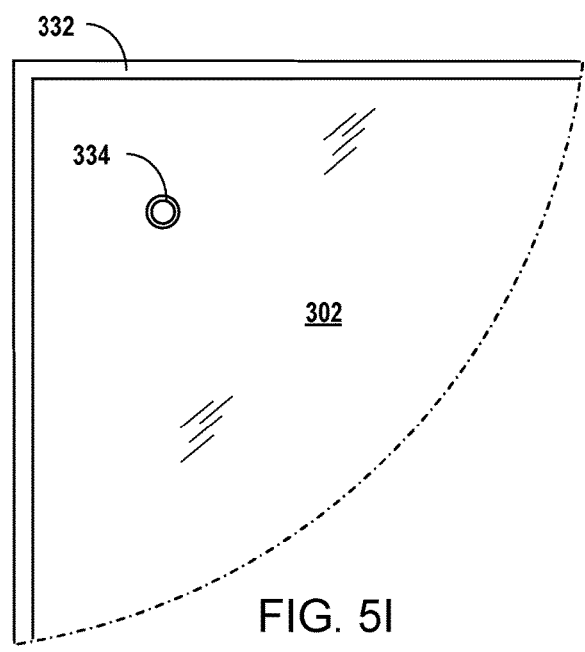
FIG. 5H
FIG. 5I

VACUUM INSULATED GLASS ASSEMBLY WITH HEATED COATING

TECHNICAL FIELD

This invention relates to thermally insulated doors for temperature controlled environments.

BACKGROUND

Refrigerated enclosures are used in commercial, institutional, and residential applications for storing and/or displaying refrigerated or frozen objects. Refrigerated enclosures may be maintained at temperatures above freezing (e.g., a refrigerator) or at temperatures below freezing (e.g., a freezer). Refrigerated enclosures have one or more thermally insulated doors or windows for viewing and accessing refrigerated or frozen objects within a temperature-controlled space. Doors for refrigerated enclosures include thermally insulated glass panel assemblies.

SUMMARY

One broad aspect of the invention features a refrigerated display case door panel assembly. The panel assembly includes a vacuum-insulate glass (VIG) panel assembly, an additional pane of glass, and an electrically conductive coating disposed between the VIG panel assembly and the additional pane of glass. The VIG panel assembly includes two panes of glass bounding a sealed evacuated space between the panes. The additional pane of glass is laminated across one of the panes of glass of the VIG panel assembly to form a refrigerator side of the door. The electrically conductive coating extends across at least a majority of a viewing area of the door and is connected to an electrical conduit for electrically heating the coating to apply heat across the viewing area between the VIG panel assembly and the additional pane of glass. This and other implementations can each optionally include one or more of the following features.

Some implementations include a frame around a periphery of the assembly with hinge points along one edge of the frame.

In some implementations, at least one of the two panes of glass of the VIG panel assembly comprise tempered glass. In some implementations, the VIG panel assembly comprises spacers separating the two panes of glass.

In some implementations, the additional pane of glass is laminated across one of the panes of glass of the VIG panel using a laminating layer of one, or more, of the following materials polyvinyl butyral (PVB), ethylene-vinyl acetate (EVA), polyethylene-vinyl acetate (PEVA), or thermoplastic polyurethane (TPU).

In some implementations, the electrically conductive coating extends across essentially all of the viewing area. Some implementations include a gap between an edge of the electrically conductive coating and an edge of the panel assembly.

Some implementations include first and second bus bars. The first bus bar is connected to the electrically conductive coating at a first end of the electrically conductive coating and the second bus is connected to the electrically conductive coating at a second end of the electrically conductive coating, the second end being spaced from the first end.

Another aspect of the invention features a refrigerated display case door. The door includes a glass panel assembly and a frame around a periphery of the glass panel assembly. The panel assembly includes a vacuum-insulate glass (VIG) panel assembly, an additional pane of glass, and an electrically conductive coating disposed between the VIG panel assembly and the additional pane of glass. The VIG panel assembly includes two panes of glass bounding a sealed evacuated space between the panes. The additional pane of glass is laminated across one of the panes of glass of the VIG panel assembly to form a refrigerator side of the door. The electrically conductive coating extends across at least a majority of a viewing area of the door and is connected to an electrical conduit for electrically heating the coating to apply heat across the viewing area between the VIG panel assembly and the additional pane of glass. This and other implementations can each optionally include one or more of the following features.

In some implementations, the frame includes a hinge channel extending through one side of the frame, where the hinge channel houses wiring connected to electrically conductive coating. In some implementations, the wiring is connected to first and second bus bars of the panel assembly. The first bus bar is connected to the electrically conductive coating at a first end of the electrically conductive coating and the second bus is connected to the electrically conductive coating at a second end of the electrically conductive coating, the second end being spaced from the first end.

Another aspect of the invention features a refrigerated display case. The display case includes a plurality of doors mounted in an opening of the display case. Each of the plurality of doors includes a glass panel assembly and a frame around a periphery of the glass panel assembly. The panel assembly includes a vacuum-insulate glass (VIG) panel assembly, an additional pane of glass, and an electrically conductive coating disposed between the VIG panel assembly and the additional pane of glass. The VIG panel assembly includes two panes of glass bounding a sealed evacuated space between the panes. The additional pane of glass is laminated across one of the panes of glass of the VIG panel assembly to form a refrigerator side of the door. The electrically conductive coating extends across at least a majority of a viewing area of the door and is connected to an electrical conduit for electrically heating the coating to apply heat across the viewing area between the VIG panel assembly and the additional pane of glass.

The concepts described herein may provide several advantages. For example, implementations of the invention may provide a vacuum insulated glass assembly that is less susceptible to thermal stresses. Implementations may prevent or minimize condensation build up on vacuum insulated doors. Implementations provide efficient condensation clearing with high voltage electrical coatings while maintaining consumer safety.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3A is an exploded view of the exemplary panel assembly shown in FIG. 1.

FIG. 3B is a front elevation view of the exemplary panel assembly shown in FIG. 3A.

FIG. 3E is a semi-exploded view of the side cross-sectional view of the exemplary panel assembly shown in FIG. 3A.

FIG. 3F is a detail view of a portion of the exemplary laminate layer and electrically conductive coating of the panel assembly.

FIG. 5H is a front elevation view of one of the vacuum panes which may be used to form the vacuum panel assembly in FIG. 3A.

FIG. 5I is a detail view of a portion of the vacuum pane shown in FIG. 5H.

Like reference symbols in the various drawings indicate like elements.

DETAILED DESCRIPTION

Figure 1:
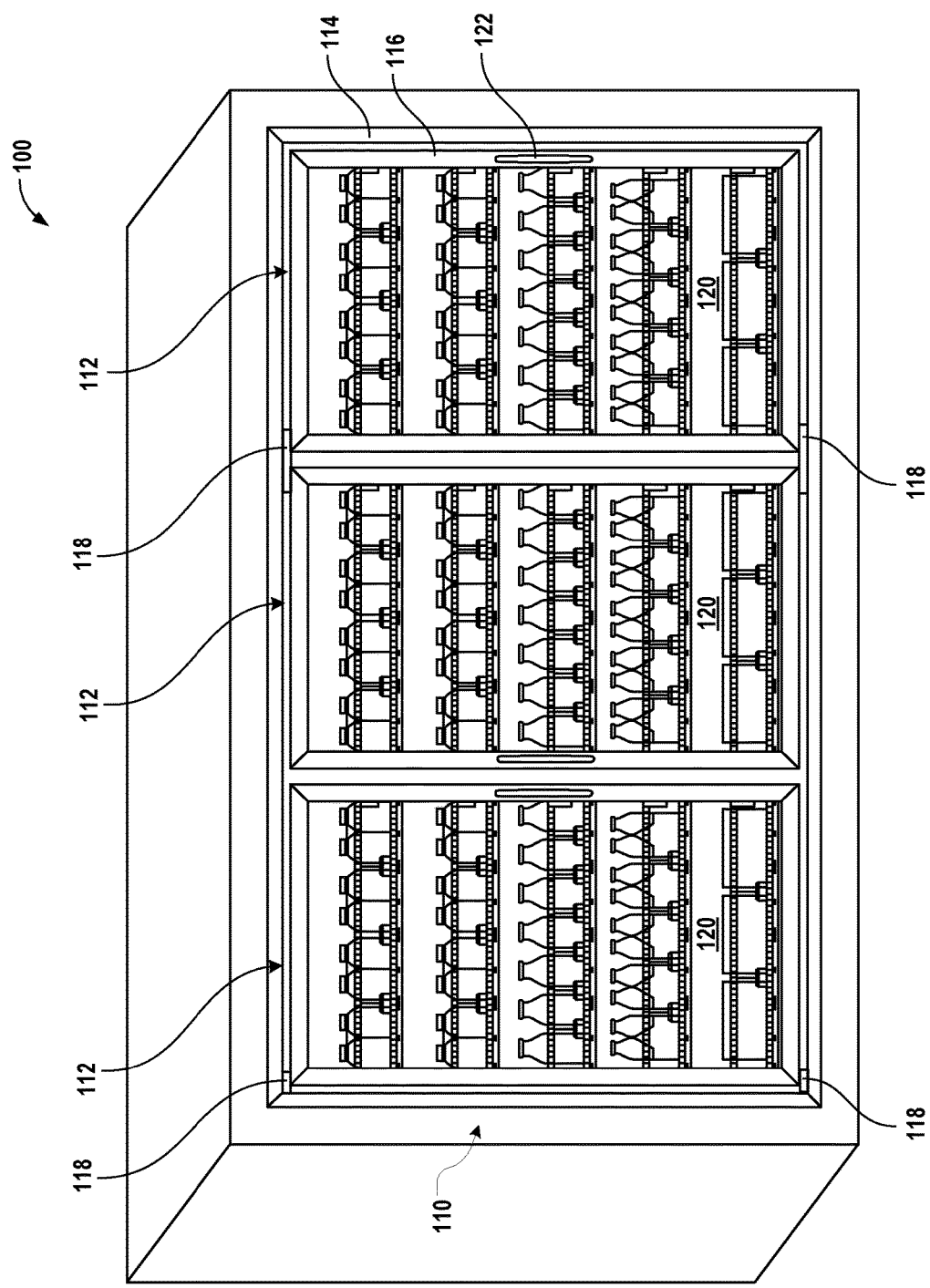
FIG. 1 is a perspective view of a display case door assembly including three display case doors mounted to a display case frame, each door having a transparent panel assembly, according to an exemplary implementation.
Figure 2:
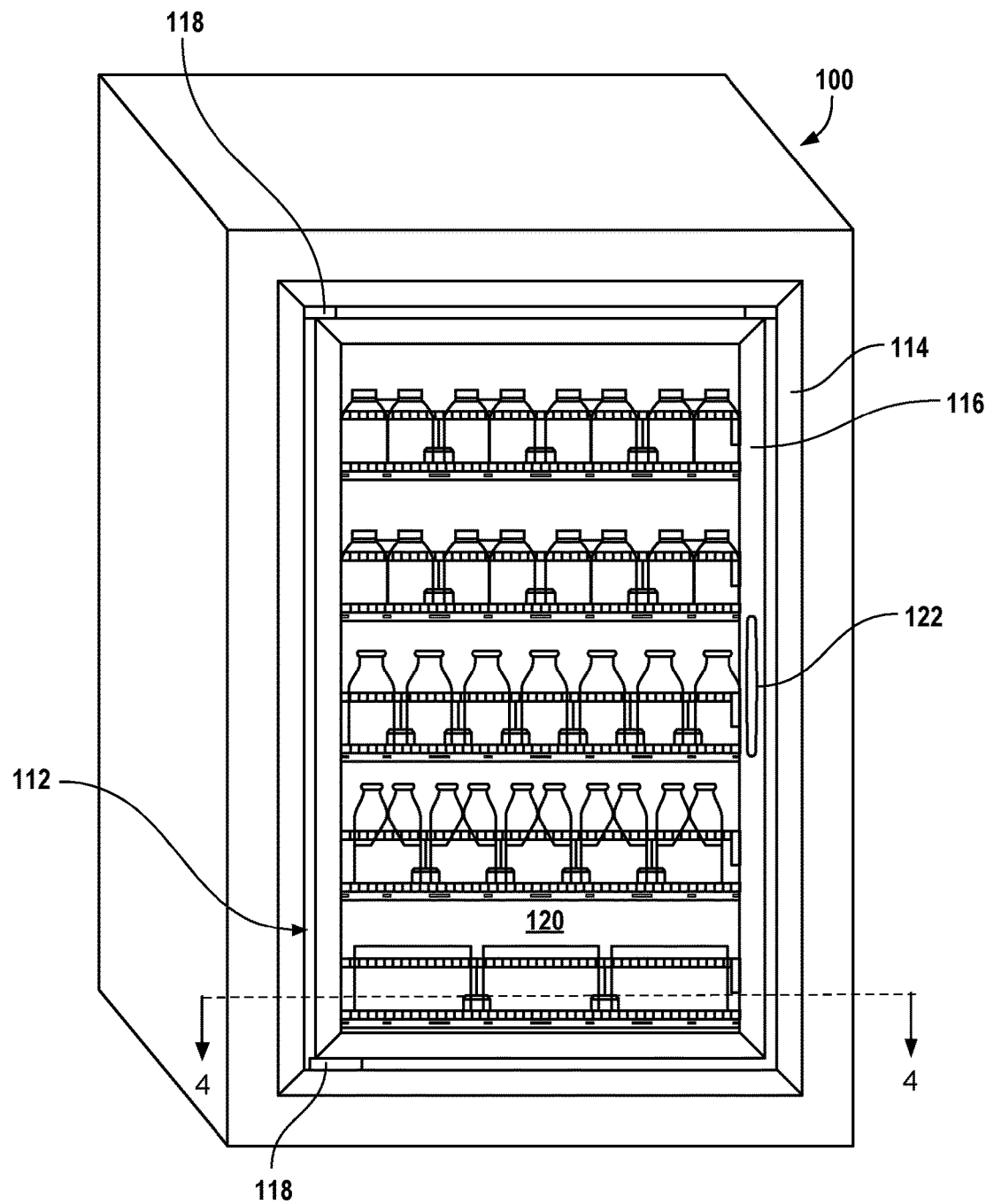
FIG. 2 is a front elevation view of the display case door assembly of FIG. 1, according to another exemplary implementation.

FIGS. 1-2 illustrate an exemplary display case door assembly 110 installed in a refrigerated display case 100. The refrigerated display case 100 may be a refrigerator, freezer, or other enclosure defining a temperature-controlled space. For example, refrigerated display case 100 may be a refrigerated display case or refrigerated merchandiser in grocery stores, supermarkets, convenience stores, florist shops, and/or other commercial settings to store and display temperature-sensitive consumer goods (e.g., food products and the like). Refrigerated display case 100 can be used to display products that must be stored at relatively low temperatures and can include shelves, glass doors, and/or glass walls to permit viewing of the products supported by the shelves. In some implementations, refrigerated display case 100 is a refrigerated display unit used, for example, in warehouses, restaurants, and lounges. For example, refrigerated display case 100 can be a free standing unit or "built in" unit that forms a part of the building in which the refrigerated display case 100 is located.

Display case door assembly 110 includes a plurality of display case doors 112 mounted in a display case frame 114. Each display case door 112 includes a panel assembly 120 mounted in a door frame 116. Doors 112 each include a handle 122. Doors 112 are pivotally mounted on the case frame 114 by hinges 118. In some implementations, doors 112 can be sliding doors configured to open and close by sliding relative to the case frame 114.

As discussed in more detail below, panel assembly 120 includes a vacuum-insulated glass (VIG) panel assembly, an electrically conductive coating disposed between the VIG panel assembly, and another pane of glass that is laminated across the VIG panel assembly. In some implementations, panel assembly 120 may be used as part of a door assembly configured to provide a thermal insulation effect (e.g., for a refrigerated display case) or otherwise used as any type of transparent or substantially transparent panel that provides a thermal insulation effect (e.g., a sliding or hinged window, a fixed-position window, a revolving or sliding door, a hinged door, etc.). In some implementations, panel assembly 120 may be used as an insulated window or for a display case 100.

Door frame 116 extends around each of the top, bottom and side edges of panel assembly 120. For example, door frame 116 includes a top frame member, a bottom frame member, and two side frame members. Door frame 116 may be attached to the edges of the panel assembly 120 by a friction fit of an adhesive. In some implementations, door frame members may be attached to one and other using mechanical fasteners.

In some implementations, on or more sides of door frame 116 can be omitted to provide a frameless display case door 112. For example, panel assembly 120 can be mounted within the opening into the display case 100 by a rail mounted on one side of the assembly 120. The rail can be mounted on hinges 118 to attach panel assembly 120 to the display case 100 without requiring a complete frame to support and/or contain panel assembly 120. Omitting portions of the door frame 116 may enhance a minimalistic appearance of the display case door assembly 110 and supplement the aesthetics provided by panel assembly 120, which appears as a single pane of glass.

In some implementations, hinges 118 can be a torque hinges. Torque hinges may be configured to apply a torque to door 112 which automatically returns door 112 to a closed position. For example, the torque hinges may include internal springs (e.g., torsion springs, linear springs, etc.) which store energy when door 112 is opened and apply a closing torque to door 112 (i.e., a torque which causes door 112 to move toward the closed position). In some implementations, the torque hinges are attached directly to panel assembly 120. Examples of torque hinges which may be used in display case door assembly 110 include any of the torque hinges manufactured by TorqMaster International of Stamford, Conn.

Display case door 112 includes a handle 122. Handle 122 may be used to open, close, lock, unlock, seal, unseal, or otherwise operate display case door 112. Handle 122 can be made from extruded aluminum tubes that are cut to a specified dimension and bonded to a front surface of display case door 112. In some implementations, handle 122 may be attached to a member of a door frame. In some implementations, handle 122 may be attached to the panel assembly 120, e.g., using an adhesive or epoxy.

Panel assembly 120 includes one or more panes of transparent or substantially transparent glass (e.g., insulated glass, non-tempered glass, tempered glass, etc.), plastics, or other transparent or substantially transparent materials. In some implementations, panel assembly 120 includes multiple layers of transparent panes (i.e., multiple panes per door 112). For example, panel assembly 120 can be a multi-pane unit having a first vacuum pane and a second vacuum pane that are separated by a gap which can be evacuated to draw a vacuum between the vacuum panes, thereby, forming a VIG assembly. Panel assembly 120 also includes an electrically conductive coating disposed between one of the panes of the VIG assembly and a third glass pane. When an electric current is supplied to the electrically conductive coating, the coating provides heat to the vacuum pane nearest to the coating.

In some implementations, door 112 is oriented within a temperature-controlled display case 100 such that the side of panel assembly 120 on which the electrically conductive coating is located is oriented towards the environment with the coldest temperature. For example, if the temperature-controlled display case 100 shown in FIG. 1 is a refrigerator or a freezer, panel assembly 120 would be oriented such that the electrically conductive coating is oriented nearest the inside surface 324 of the panel assembly 120. Whereas, if the temperature-controlled display case 100 were a warmer or a heater, panel assembly 120 would be oriented such that the electrically conductive coating is oriented nearest the outside surface of the panel assembly 120. Vacuum insulated assemblies provide very efficient insulation, and, as such, a steep temperature gradient may form across the panel assembly 120 which may result in undesirable thermal stresses. The electrically conductive coating can be used to provide a desired amount of heat directly to the side of the VIG assembly at the colder temperature, thereby reducing some of the thermal stresses. In some implementations (e.g., a freezer), the amount of current supplied to the electrically conductive coating can be chosen to be sufficient to reduce thermal stresses without unnecessarily radiating additional heat into the freezer.

For simplicity, in the remainder of this disclosure panel assembly 120 is described as if it is installed in a freezer such that the inside surface of panel assembly 120 is nominally at a lower temperature than the outside surface when the door 112 is closed.

Figure 3C:
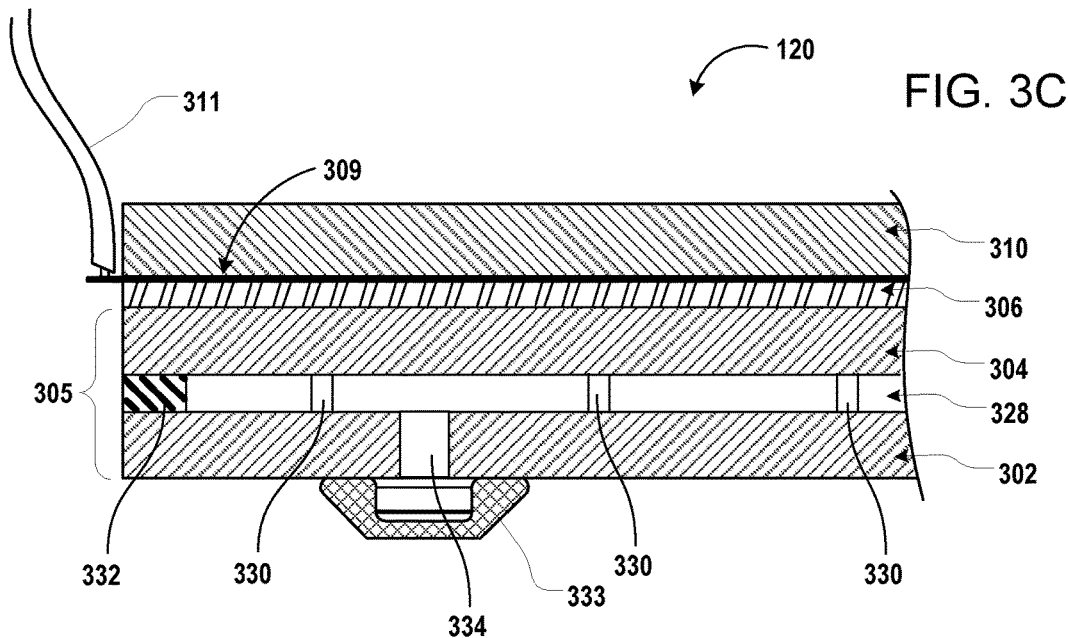
FIG. 3C is a side cross-sectional view of the exemplary panel assembly shown in FIG. 3A.
Figure 3D:
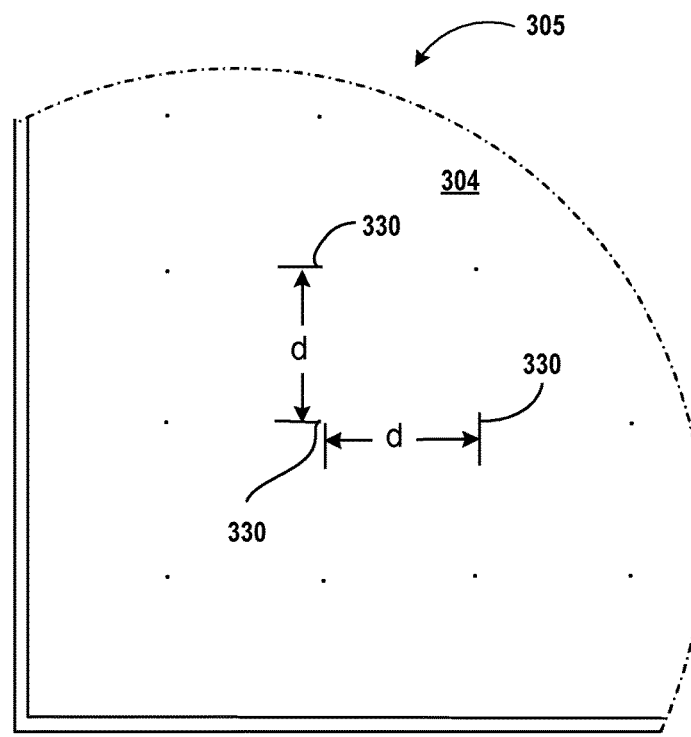
FIG. 3D is a detail view of a portion of the exemplary vacuum panel assembly of the panel assembly.

FIGS. 3A-3F include several drawings illustrating a representative panel assembly 120 in greater detail. FIG. 3A is an exploded view of panel assembly 120; FIG. 3B is a front elevation view of panel assembly 120; FIG. 3C is a detail view of the portion of panel assembly 120 circled in FIG. 3B, and FIG. 3D is a side cross-section view of panel assembly 120.

Panel assembly 120 includes a front vacuum pane 302 and a rear vacuum pane 304, a laminate layer 306, an electrically conductive coating 308, and a rear pane 310. Front vacuum pane 302 has an outside surface 312 (e.g., which also serves as the outside surface of the panel assembly 120) and an inside surface 314. For example, outside surface 312 faces toward a consumer standing in front of the display case when door 112 is closed. Inside surface 314 faces toward merchandise within the display case when door 112 is closed. Rear vacuum pane 304 has a first surface 316 and a second surface 318. For example, first surface 316 faces toward a consumer standing in front of the display case when door 112 is closed. Second surface 318 faces toward merchandise within the display case when door 112 is closed. Laminate layer has a first surface 320 and a second surface 322. For example, first surface 320 faces toward a consumer standing in front of the display case when door 112 is closed. Second surface 322 faces toward merchandise within the display case when door 112 is closed. Rear pane 310 has a first surface 324 and a second surface 326 (e.g., which also serves as the inside surface of the panel assembly 120). For example, first surface 324 faces toward a consumer standing in front of the display case when door 112 is closed. Second surface 326 faces toward merchandise within the display case when door 112 is closed.

Front vacuum pane 302 and rear vacuum pane 304 are assembled together to form a VIG panel assembly 305. Together, front vacuum pane 302 and rear vacuum pane 304 bound an evacuated space 328 between the panes 302 and 304. The inside surface 314 of front vacuum pane 302 is separated from the first surface 316 of second vacuum pane 304 by the evacuated space 328. Electrically conductive coating 308 can be applied to either first surface 320 or second surface 322 of laminate layer 306. Laminate layer 306 is placed in contact with the second surface 318 of rear vacuum pane 304. Rear pane 310 is placed in contact with the second surface 322 of laminate layer 306. Rear pane 310 and laminate layer 306 can be laminated to the rear vacuum pane 304 of the VIG panel assembly 305. In some implementations, electrically conductive coating 308 is applied to a surface of the rear vacuum pane 304 or a surface of the rear pane 310. For example, rear pane 310 can be glass pane with a heated coating applied such as the Thermique Heated Glass available from Engineered Glass Products™.

The electrically conductive coating 308 extends across a majority of the viewing area of panel assembly 120. For example, the viewing area may be that portion of the inside surface and outside surface 326 of panel assembly 120 that is not covered by door frame 116. In some implementations, electrically conductive coating 308 extends across the entire viewing area of panel assembly 120. In some implementations (as shown in FIG. 3F), the edges 336 of electrically conductive coating 308 do not extend to the edges 338 of panel assembly 120. For example, edges 336 of electrically conductive coating 308 can be deleted such that the there is a gap of a distance "X" between the edge 336 of electrically conductive coating 308 and an edge 338 of panel assembly 120. For example, the edges 336 of electrically conductive coating 308 can be deleted such that the gap is formed between the edge 336 of electrically conductive coating 308 and an edge 338 of either vacuum pane 304, or an edge of rear pane 310 depending on which surface (320 or 322) of laminate layer 306 electrically conductive coating 308 is placed. The gap may extend around the entire perimeter of electrically conductive coating 308. For example, the gap may be a distance "X" of about 0.25 inches from the edge 338 of panel assembly 120. In some implementations, the gap may be a distance of about 0.25 inches from an edge of solder seal on panel assembly 120 (e.g., perimeter seal 332 formed using a conductive solder Electrically conductive coating 308 can be a high voltage/high power coating (e.g., greater than about 30 V RMS (42.4 V peak) or 60 V DC) capable of quickly clearing condensation disposed between VIG assembly 305 and rear pane 310 for increased safety. Such implementations may also improve the energy efficiency of the display case 100, because power can be rapidly supplied to electrically conductive 308 to quickly clear condensation while door 112 is open, thereby reducing the heat that needs to be applied when the door 112 is closed and which would be transmitted into the refrigerated display case 100.

In some implementations, electrically conductive coating 308 is applied to the exposed surface 326 of rear pane 310. In such implementations, electrically conductive coating 308 may be a coating that uses only low voltages (e.g., less than about 30 V RMS (42.4 V peak) or 60 V DC) for consumer safety.

As noted above, electrically conducive coating 308 can be used to apply heat across the viewing area of the panel assembly 120 between VIG panel assembly 305 and rear pane 310. For example, electrically conductive coating 308 can be used to provide a desired amount of heat to rear vacuum pane 304 of VIG assembly 305 to reduce some of the thermal stresses that may form across VIG assembly 305. In some implementations (e.g., a freezer), a sufficient current can be supplied to the electrically conductive coating so as to reduce thermal stresses, while minimizing the amount of heat that may radiate into a freezer (e.g., through rear pane 310). The heat produced by electrically conductive coating 308 helps to prevent or remove condensation from rear pane 310, for example, when a freezer door 112 is opened into a humid environment. That is, in a freezer the temperature of the inside surface of panel assembly 120 may be below the dew point of the external environment. When a customer opens door 112, water vapor in the air may tend to condense on the inside surface. The heat produced by electrically conductive coating 308 may warm the inside surface sufficiently to prevent the condensation from forming, or to aid in rapidly clearing any condensation that may form.

In some implementations, electrical power is supplied to electrically conductive coating 308 by parallel bus bars 309. Bus bars 309 are spaced apart from each other and are electrically connected to opposites sides of electrically conductive coating 308. For example, bus bars 309 can be connected to the top and bottom of electrically conductive coating 308 (e.g., as illustrated in FIG. 3A). In some implementations, bus bars 309 can be connected to electrically conductive coating 308 on either side of the coating 308 (e.g., left and right sides). Each bus bar may include an electrode 340 or solder tab for connecting the electrically conductive coating to lead wires 311 connected to an electrical power source. In this arrangement, electric current may pass through one of the lead wires 311, to a first of the bus bars 309, across the electrically conductive coating 308 to the second bus bar 309, and through the other lead wire 311. The electric current causes heat to be generated across panes 304/310 (e.g., due to electrical resistance of the coating) In some implementations, electrically conductive coating 308 is a metal oxide coating (e.g., tin oxide or silver coatings).

VIG assembly 305 may be obtained pre-assembled, and the electrically conductive coating 308 applied to one or both surfaces 320, 322 of the laminate layer 306. Laminate layer 306 is positioned between the VIG assembly 305 (e.g., adjacent to surface 318) and rear pane 310 (e.g., adjacent to surface 324). The entire panel assembly 120 can then be laminated to form a complete panel assembly 120. In some implementations, electrically conductive coating 308 is applied to one or more of the panes 302, 304, and 310. For example, electrically conductive coating 308 may be applied to surface 318 of vacuum pane 304 or surface 324 of rear pane 310.

Laminate layer 306 can be made of a polymer including, but not limited to, polyvinyl butyral (PVB), ethylene-vinyl acetate (EVA), polyethylene-vinyl acetate (PEVA), or thermoplastic polyurethane (TPU). For example, laminate layer 306 may be placed between vacuum pane 304 and rear pane 310 to reduce contact stresses that generally occur when two panes of glass are placed in direct contact with each other. In some implementations, laminate layer 306 is omitted.

Panel assembly 120 includes spacers 330 positioned between vacuum panes 302 and 304 in the evacuated space 328. Spacers 330 may be configured to maintain the separation between panes 302 and 304 when evacuated space 328 is evacuated. Spacers 330 may prevent external pressure (e.g., atmospheric pressure) from causing panes 302 and 304 to flex inward when a vacuum is drawn in evacuated space 328. Spacers 330 include a plurality of support pillars extending between panes 302 and 304 (e.g., between surfaces 314 and 316). The support pillars can be configured to provide internal compression support for panel assembly 120 to counter the pressure differential between atmospheric pressure outside panes 302 and 304 and the vacuum within evacuated space 328 between panes 302 and 304. Spacers 330 can be arranged in a grid (e.g., approximately 50 mm apart) between panes 302 and 304. In some implementations, spacers 330 are ceramic. For example, spacers 330 can be applied using a printing process or silkscreen process (e.g., as described in greater detail below) to reduce the time and effort required to properly position the spacers 330. For example, one run of a silkscreen or an automated printing process can place an entire grid of spacers 330 in proper locations without requiring a user to manually place spacers 330.

In some implementations, front vacuum pane 302 and rear vacuum pane 304 are made of tempered glass. For example, using tempered glass may improve the durability of vacuum panes 302 and 304 relative to non-tempered glass. Using tempered glass may also improve the safety of the vacuum panel assembly 305 by causing vacuum panes 302 and 304 to fracture into many small pieces in the event that breakage occurs. In some implementations, tempered glass may be able to withstand more pressure than non-tempered glass without incurring damage, and consequently, the distance between spacers 330 can be increased relative to that used for non-tempered vacuum glass panels. For example, a vacuum glass panel manufactured from non-tempered glass may require a relatively small distance between spacers 330 (e.g., 20 mm or less) in order to distribute the compressive force among more spacers 330 and to reduce the point forces exerted by spacers 330 on vacuum panes 302 and 304.

In some implementations, using tempered glass for vacuum panes 302 and 304 allows spacers 330 to be separated by a greater distance d, as shown in FIG. 3C. In some Implementations, distance d is between 20 mm and 80 mm. In some implementations, distance d is between 40 mm and 60 mm. In some implementations, distance d is approximately 50 mm or 2 inches. Such a distance between spacers 330 would not be feasible for non-tempered glass because it results in less spacers 330, thereby distributing the compressive force among less spacers 330 and increasing the point forces exerted by spacers 330 on vacuum panes 302 and 304.

Panel assembly 120 is shown to include a perimeter seal 332. Perimeter seal 332 may be glass solder, ceramic frit, or another sealing material configured to bond panes 302 and 304 along a perimeter thereof. The perimeter seal 332 may to provide an airtight (i.e., hermetic) seal within evacuated space 328. Perimeter seal 332 can be applied to one or both of vacuum panes 302 and 304 prior to assembly. Perimeter seal 332 may extend along an entire perimeter of panel assembly 120. Perimeter seal 332 may form a closed perimeter (e.g., a rectangle) and may be bonded to both of vacuum panes 302 and 304. Spacers 330 are contained within the closed perimeter formed by perimeter seal 332.

Perimeter seal 332 can be made of an inorganic material capable of providing a hermetic seal within evacuated space 328. In some implementations, perimeter seal 332 is made of an alloy material specifically formulated for joining glass, silicon, and other types of silicates. For example, perimeter seal 332 can be made of a metallic alloy or an active solder including, but not limited to, tin, silver, and titanium. In some implementations, perimeter seal 332 is formed using the "S-BOND® 220M" alloy manufactured by S-Bond Technologies, LLC.

In some implementations, perimeter seal 332 is a ceramic frit made from a granulated or powdered ceramic or glass material. The ceramic frit may be a ceramic composition that has been fused in a fusing oven, quenched to form a glass, and granulated. The ceramic frit may be applied to vacuum panes 302 and/or 304 in the form of a powdered or granulated solid, paste, slurry, suspension, or other composition. In some implementations, the ceramic frit is bonded to the perimeter of vacuum panes 302 and 304 using a sintering process. The sintering process may involve compacting and forming a solid mass of material by applying heat and/or pressure to the perimeter of vacuum panes 302 and 304 after a layer of the ceramic frit has been applied along the perimeter (e.g., between vacuum panes 302 and 304). In some implementations, the heat applied is sufficient to bond the ceramic frit to the perimeter of vacuum panes 302 and 304 without heating vacuum panes 302 and 304 to a temperature that would remove the temper from the glass.

In some implementations, perimeter seal 332 is a low-temperature solder or other sealing material that has a melting range significantly lower than the glass transition temperature of vacuum panes 302 and 304. For example, perimeter seal 332 may have a melting range of approximately 220° C.-280° C., whereas the glass transition temperature of vacuum panes 302 and 304 may be approximately 520° C.-600° C. (e.g., the glass transition temperature for soda lime glass). The relatively lower melting temperature of perimeter seal 332 allows perimeter seal 332 to melt and bond to vacuum panes 302 and 304 without heating any portion of vacuum panes 302 and 304 to a temperature that would remove the temper from the glass. In some implementations, this allows vacuum panes 302 and 304 that are made of tempered glass to retain their temper throughout the manufacturing/bonding process. This advantage allows panel assembly 120 to include multiple parallel panes of tempered glass (i.e., vacuum panes 302 and 304) bonded together along their perimeter to form a hermetic seal around evacuated space 328.

In some implementations, vacuum panes 302 and 304 are bonded together using an ultrasonic welding process. For example, the ultrasonic welding can be an industrial technique in which high-frequency ultrasonic acoustic vibrations are applied locally to work pieces held together under pressure. The ultrasonic welding process creates a solid-state weld. An example ultrasonic welding system includes a high-frequency voltage generator, a converter (i.e., an ultrasonic transducer), a booster, and a welding tool called a sonotrode. The high-frequency voltage generator converts an input voltage into a high frequency voltage, which is transformed by the converter into mechanical oscillations of the same frequency. The booster modifies (i.e., amplifies) the amplitude of vibration based on a signal from a controller. The sonotrode emits the converted energy in the form of mechanical shear waves into the components being welded together (i.e., vacuum panes 302 and 304). During the welding process, the sonotride may be pressed onto an exterior surface of vacuum pane 302 or vacuum pane 304 by a perpendicular force. For example, the perpendicular force may be within the range of 250 N-350 N.

The ultrasonic welding process may be performed at temperatures well below the glass transition temperature of vacuum panes 302 and 304. For example, the ultrasonic welding process can be performed to form a hermetic seal between vacuum panes 302 and 304 without exposing any portion of vacuum panes 302 and 304 to a temperature that would remove temper from the glass panes. Thus, in some implementations, the ultrasonic welding process allows vacuum panes 302 and 304 to be made of tempered glass and to retain their temper throughout the ultrasonic welding process. The ultrasonic welding can be performed with or without an intermediate adhesive or solder to bond vacuum panes 302 and 304 during the process. For example, a perimeter seal 332 may be used in some implementations and omitted in others. In implementations in which the perimeter seal 332 is used, the ultrasonic welding process can be performed to melt and bond the perimeter seal 332 to vacuum panes 302 and 304 at a temperature significantly below the glass transition temperature of vacuum panes 302 and 304. In implementations in which the perimeter seal 332 is not used, the ultrasonic welding process can be performed to bond vacuum panes 302 and 304 directly to each other.

In some implementations, perimeter seal 332 and spacers 330 are formed using a printing process (e.g., 2D or 3D printing, ceramic in-glass printing, etc.). In some implementations, perimeter seal 332 and spacers 330 are formed using an additive manufacturing process. For example, a printer (e.g., a dot-matrix printer, a ceramic printer, a 3D printer, etc.) can be used to print a layer of material along the perimeter of vacuum pane 304 and/or vacuum pane 304 to form perimeter seal 332. The printer can also be used to print columns or dots of material to form a grid of spacers 330 at the locations shown in FIGS. 3B-3E. In various implementations, perimeter seal 332 and spacers 330 may be formed using different materials or the same material. For example, the printer may be configured to print a layer of a first material along the perimeter of vacuum panes 302 and/or 304 to form perimeter seal 332, and a layer of a second material to form spacers 330 at the locations shown in FIGS. 3B-3E. The different materials/layers may be printed sequentially or concurrently using a printer that can switch between printing different materials.

In some implementations, perimeter seal 332 and spacers 330 are formed using a glass printing process. For example, the glass printing process can include using an in-glass printer and/or digital ceramic inks to print perimeter seal 332 and/or spacers 330 onto a surface of vacuum pane 302 and/or vacuum pane 304. For example, in-glass printers and digital ceramic inks may which may be used to perform the glass printing process may include those manufactured by Dip-Tech Digital Printing Technologies Ltd. The glass printing process may include printing a layer of ceramic ink onto vacuum pane 302 and/or vacuum pane 304, drying the ceramic ink (e.g., using a blower or dryer), placing vacuum panes 302 and 304 in parallel with each other with the layer of ceramic ink between vacuum panes 302 and 304, and tempering the assembly to fuse the ceramic ink to both vacuum panes 302 and 304.

Panel assembly 120 includes a vacuum port 334. The vacuum port 334 is used to remove air from evacuated space 328 after panel assembly 120 has been assembled in order to draw a vacuum within evacuated space 328. Vacuum port 334 may extend through either vacuum pane 302 or vacuum pane 304. Vacuum port 334 may be formed (e.g., drilled, cut, etc.) prior to tempering vacuum panes 302 and 304, for example, to avoid damage that could result from forming a vacuum port in tempered glass. After vacuum port 334 is formed, in some implementations, vacuum panes 302 and 304 may be tempered. In some implementations, the vacuum port 334 is covered by a cap 333 once the vacuum has been drawn within evacuated space 328. The cap 333 can be adhered to a surface of pane 302 or pane 304 (e.g., surface 312) using any of a variety of adhesives or sealing materials. In some implementations, cap 333 is adhered using the same material used to form perimeter seal 332.

In some implementations, panel assembly 120 includes a getter 331 located within evacuated space 328. Getter 331 may be a reactive material configured to remove small amounts of gas from evacuated space 328. For example, getter 331 may be configured to combine chemically with gas molecules within evacuated space 328 or may remove the gas molecules by adsorption. The getter 331 aids in forming and maintaining the vacuum within evacuated space 328 by removing any gas molecules not removed through the vacuum port 334. The getter 331 also may serve to remove gas molecules that leak into evacuated space 328 over time. In some implementations, getter 331 is inserted into evacuated space 328 in a preformed condition. In some implementations, getter 331 is printed onto vacuum panel 302 or 304 along with perimeter seal 332 and/or spacers 330.

In some implementations, one or more of surfaces 312-326 have a film or coating applied. For example, an anti-condensate film or coating may be applied to one or more of surfaces 312-326. Example anti-condensate films and coatings include, but are not limited to, pyrolitic coatings and mylar coatings. For example, the anti-condensate film or coating may be applied to surface 326 to help prevent the contamination of merchandise in the temperature-controlled display case 100 in the event that vacuum pane 302, 304, or rear pane 310 are damaged (e.g., by containing glass shards). The anti-condensate coating can be applied to any of surfaces 312-326 or to a surface of another pane or panel of panel assembly 120. For example, the anti-condensate coating can be applied to an optional safety panel located adjacent to surface 312. The anti-condensate coating can be applied by spraying, adhering, laminating, or otherwise depositing the coating (e.g., using chemical vapor deposition or any other suitable technique) onto a surface 312-326. In some implementations, the anti-condensate coating is made of a self-healing material (e.g., urethane) and is capable of healing scratches.

In some implementations, a display case door 112 is configured to maximize visible light transmission from inside the case to the customer, thereby, improving the ability of customers to view display items. In some implementations, it may be desirable to minimize the transmission of non-visible light (i.e., ultraviolet and infrared light) through panel assembly 120 from outside to inside the case in order to improve thermal performance (e.g., by reducing radiation heat transfer) and to protect items therein. An anti-transmissive coating may be applied to one or more of the panes 302, 304, and 310. The anti-transmissive coating may absorb or reflect infrared light, ultraviolet light, or any combination thereof. The anti-transmissive coating may absorb or reflect some frequencies of visible light in addition to infrared and/or ultraviolet light.

In some implementations, display case door 112 is configured to use non-visible wavelengths of light to heat panel assembly 120, thereby reducing or preventing condensation. For example, one or more of panes 302, 304, and 310 may include an ultraviolet (UV) inhibitor. A UV inhibitor may increase the shelf life of products within the temperature-controlled display device 11 by preventing ultraviolet light from passing through panel assembly 120. The ultraviolet light may be absorbed or reflected by the UV inhibitor and may be used as a source of energy to heat panel assembly 120. As another example, one or more panes of panel assembly 120 may be treated with a low-emissivity heat-reflective coating to improve overall thermal resistance (e.g., by reducing radiation heat transfer) and/or to prevent external condensation.

In some implementations, panel assembly 120 is a thermopane unit that appears as a single pane of glass due to the minimal separation (e.g., 0.2 mm) between vacuum panes 302 and 304, and between vacuum pane 304 and rear pane 310 (e.g., a minimal thickness of laminate layer 306). For example, laminate layer 306 can have a thickness of between about 0.001-0.006 inches. The minimal separation is achieved by providing the evacuated space 328 between vacuum panes 302 and 304, which creates a thermobreak having a high thermal resistance. The thickness of evacuated space 328 can be precisely controlled by providing spacers 330 to maintain the separation between panes 302 and 304.

Figure 4:
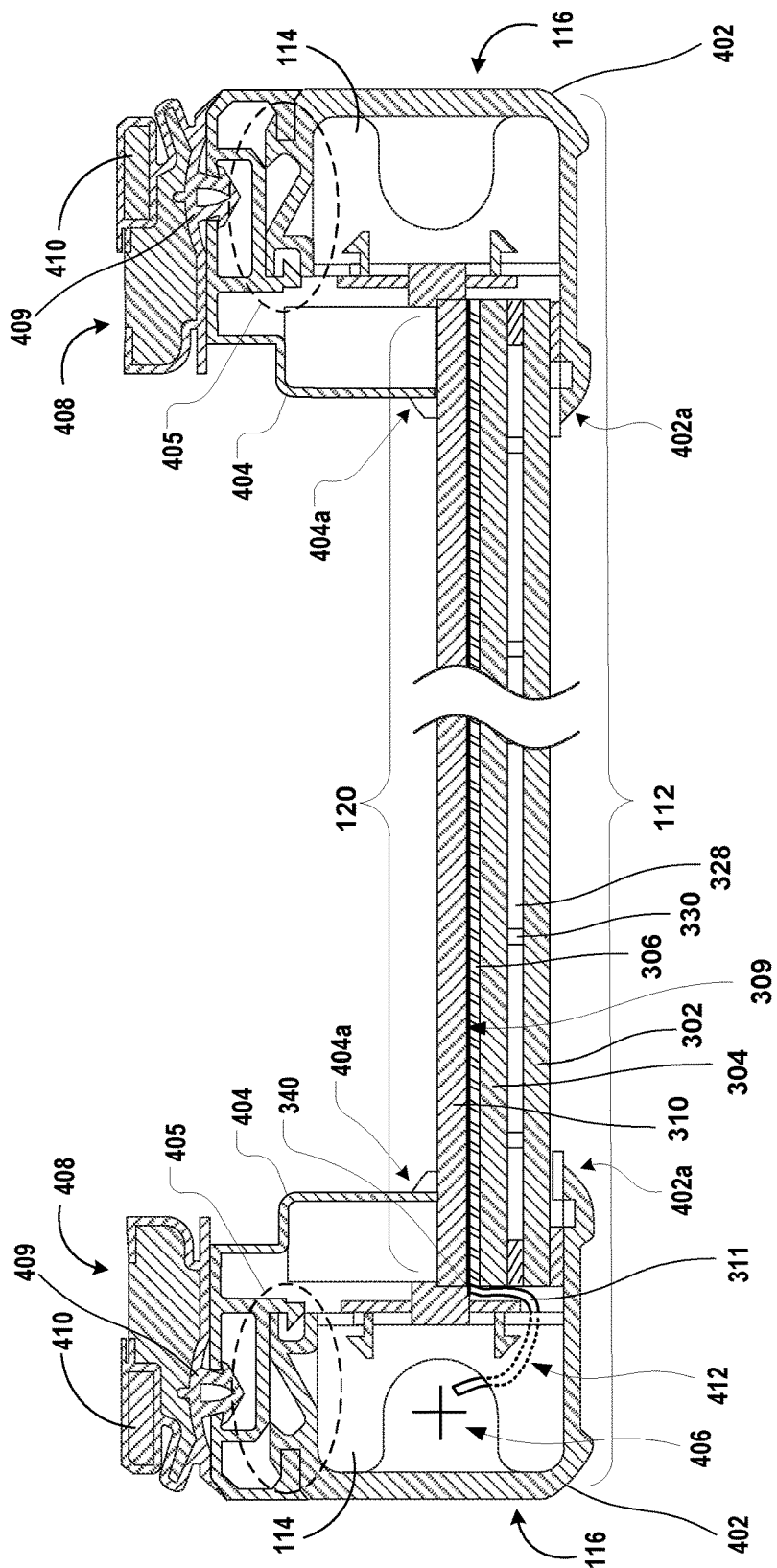
FIG. 4 is a cross-sectional plan view of the display case door assembly of FIG. 2 taken along line 4-4 of FIG. 2, according to an exemplary implementation.

FIG. 4 illustrates a cross-section view of a door 112 including a door frame 116 and panel assembly 120 according to implementations of the present disclosure. As shown, panel assembly 120 is mounted in a door frame 116. Door frame 116 includes an outer member 402 and an inner member 404 which are couple together around the edges of the panel assembly 120. The edges of panel assembly 120 are retained within frame 116 by being sandwiched between respective ends 402a, 404a of outer and inner frame members 402 and 404. Outer and inner members 402 and 404 may be coupled by a coupling joint 405 (as shown). In some implementations, outer and inner members 402 and 404 can be coupled together using fasteners (e.g., screws, rivets), an adhesive, or other appropriate coupling methods. Frame 116 includes a gasket 408 attached to inner frame member 404. Gasket 408 is attached to inner frame member 404 by a snap-fit joint 409. Gasket 408 is attached along the perimeter of frame 116. Gasket 408 may employ a flexible bellows, which, when doors 112 are closed, engage a sealing surface of case frame 114 to provide a seal between doors 112 and case frame 114. Gasket 408 can include a magnet 410 to ensure a positive seal between gasket 408 and the sealing surface of the case frame 114.

Outer frame member 402 includes a hinge channel 406. Hinge channel 406 is designed to couple with the hinge 118 and electrical hinge pin, discussed below. In some implementations, outer frame member 404 includes a hinge spacer 414. Hinge spacer 414 may provide a secure fit between the hinge channel 406 and the electrical hinge pin. A pathway 412 is provided for wires 311 to be passed from the hinge channel 406 and connected to the bus bar electrode 340.

Figure 5A:
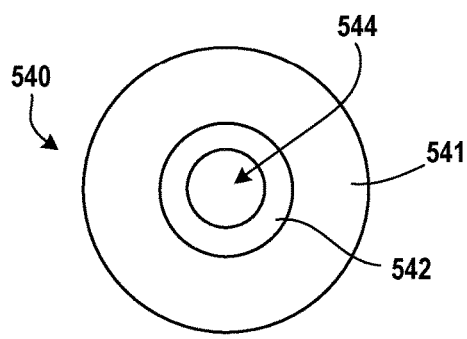
FIG. 5A is a top view of a vacuum tube which may be used to draw a vacuum within the vacuum panel assembly.
Figure 5C:
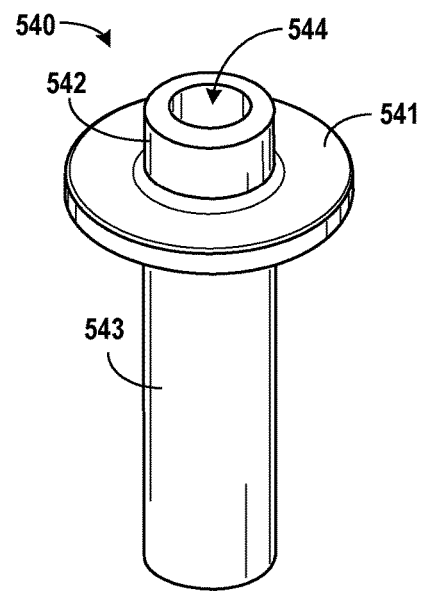
FIG. 5C is a perspective view of the vacuum tube shown in FIG. 5A.
Figure 5B:
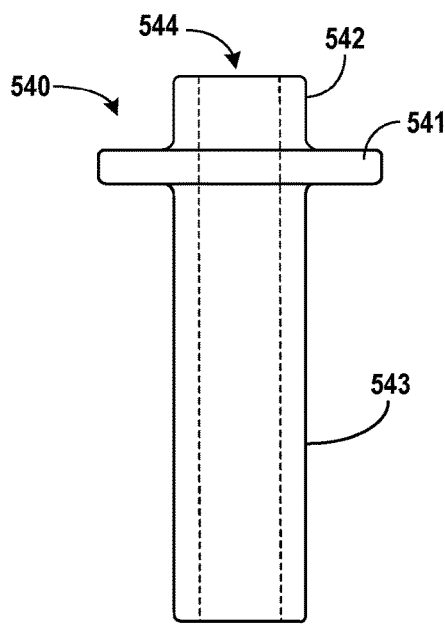
FIG. 5B is a front cross-sectional view of the vacuum tube shown in FIG. 5A.

Referring now to FIGS. 5A-5C, several drawings of a vacuum tube 540 are shown, according to a representative implementation. FIG. 5A is a top view of vacuum tube 540; FIG. 5B is a front cross-sectional view of vacuum tube 540; and FIG. 5C is a perspective view of vacuum tube 540. Vacuum tube 540 may be used to pump air out of evacuated space 328 via vacuum port 334. For example, vacuum tube 540 may be inserted into vacuum port 334 and may be configured to attach to an external vacuum pump. In some implementations, vacuum tube 540 is made of a soft copper material. In some implementations, vacuum tube 540 may be made of glass.

Vacuum tube 540 is shown as a cylindrical tube having an axial bore 544. Vacuum tube 540 includes a radial flange 541 projecting from an outer circumferential surface of vacuum tube 540 and dividing vacuum tube 540 into a first portion 542 and a second portion 543. In some implementations, flange 541 is offset from the center of vacuum tube 540 such that the axial length of first portion 542 is shorter than the axial length of second portion 543. Vacuum tube 540 may be fused or bonded to vacuum pane 302 or 304 such that first portion 542 or second portion 542 is located within vacuum port 334. In some implementations, vacuum tube 540 is bonded to vacuum pane 302 or 304 using the same material that forms perimeter seal 332 (e.g., S-Bond solder).

Figure 5D:
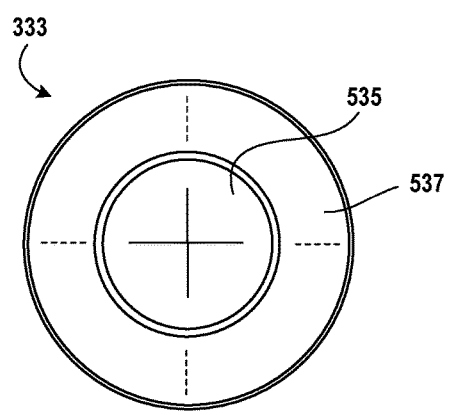
FIG. 5D is a top view of a cap which may be used to cover a vacuum port in the vacuum panel assembly.
Figure 5E:
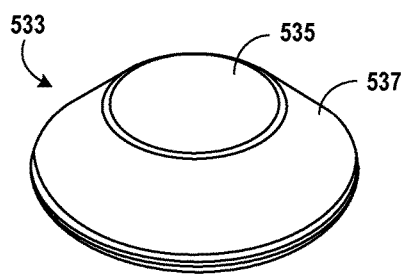
FIG. 5E is a perspective view of the cap shown in FIG. 5D.
Figure 5F:
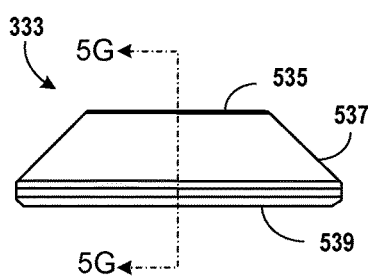
FIG. 5F is a front view of the cap shown in FIG. 5D.
Figure 5G:
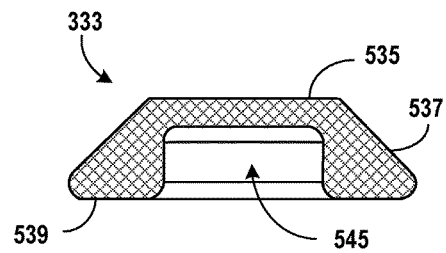
FIG. 5G is a side cross-sectional view of the cap shown in FIG. 5D.

FIGS. 5D-5G illustrate a cap 333 in greater detail. FIG. 5D is a top view of cap 333; FIG. 5E is a perspective view of cap 333; FIG. 5F is a front view of cap 333; and FIG. 5G is a side cross-sectional view of cap 333. Cap 333 is shown having a frustoconical shape including a top circular surface 535, a bottom circular surface 539, and a side surface 537 connecting top surface 535 and bottom surface 539. Top surface 535 and bottom surface 539 may be parallel surfaces offset from each other and concentrically aligned. In some implementations, top surface 535 is smaller than bottom surface 539. Side surface 537 may be oriented at an oblique angle (e.g., approximately 45 degrees) relative to top surface 535 and bottom surface 539.

As shown in FIG. 5G, a cylindrical bore 545 may extend partially through cap 333. Bore 545 may have a diameter that is substantially equal to the outer diameter of vacuum tube 540 such that first portion 542 or second portion 543 can be received in bore 545. The cap 333 may be made of a metal (e.g., aluminum, copper, stainless steel, etc.), ceramic, glass, or other inorganic material capable of maintaining the vacuum within evacuated space 328. Cap 333 may be bonded to vacuum tube 540, vacuum pane 302, and/or vacuum pane 304. For example, the inner surface of bore 545 may be bonded to the outer surface of vacuum tube 540. Bottom surface 539 may be bonded to second surface 318 of vacuum pane 302 (as shown in FIG. 3C) or to outside surface 312 of vacuum pane 302 (e.g., for implementations in which vacuum port 334 extends through vacuum pane 302).

Referring now to FIGS. 5H and 5I, vacuum pane 302 is shown in greater detail, according to an exemplary implementation. FIG. 5H is a front elevation view of vacuum pane 302 and FIG. 5I is a detail view of the portion of vacuum pane 302 highlighted in FIG. 5H. Vacuum pane 302 is shown to include a vacuum port 334 extending through the thickness of the glass (e.g., between surfaces 312 and 314). Vacuum port 334 may be formed prior to tempering vacuum pane 302 to avoid damage that could result from cutting a hole in tempered glass. After vacuum port 334 is formed, vacuum pane 302 may be tempered, along with vacuum pane 302.

Perimeter seal 332 is shown extending along the perimeter of vacuum pane 302. As previously described, perimeter seal 332 may be applied using a printing process. In some implementations, perimeter seal 332 may be applied by tinning the perimeter of vacuum pane 302 and applying perimeter seal 332 to the tinned portion Vacuum pane 304 may be the same or similar to vacuum pan 302, with the exception that vacuum pane 304 may not include vacuum port 334. In some implementations, vacuum port 334 may be formed in vacuum pane 304 (and not vacuum pane 302). One or both of vacuum panes 302 and 304 may include a low-emissivity coating, an anti-condensate coating, a heat-reflective coating, a protective laminate layer, or other types of coatings as previously described.

Figure 6:
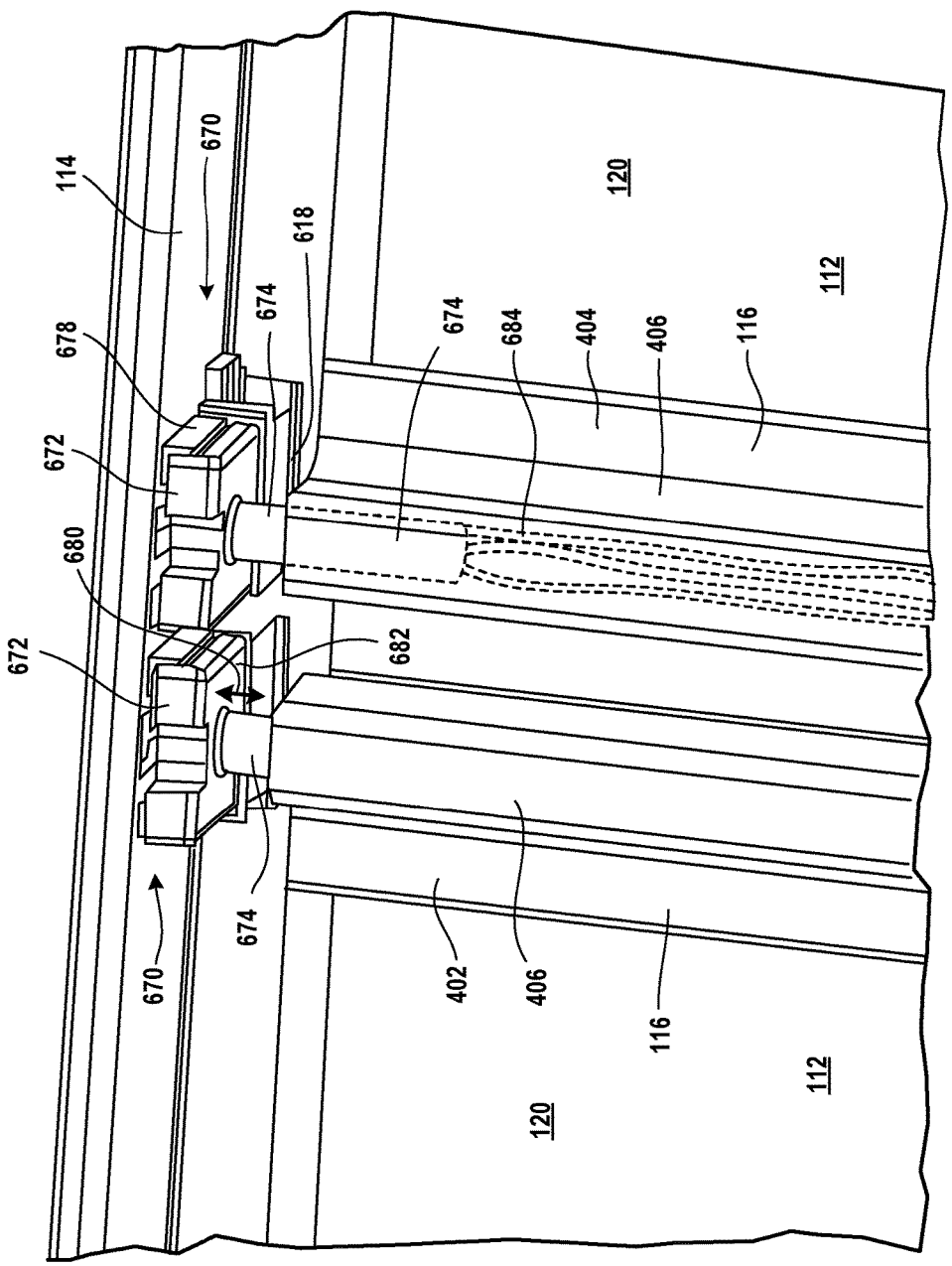
FIG. 6 is a partial interior perspective view of the assembly of door assembly FIG. 1, showing electrical hinge pins and doors, according to implementations of the present disclosure.
Figure 7:
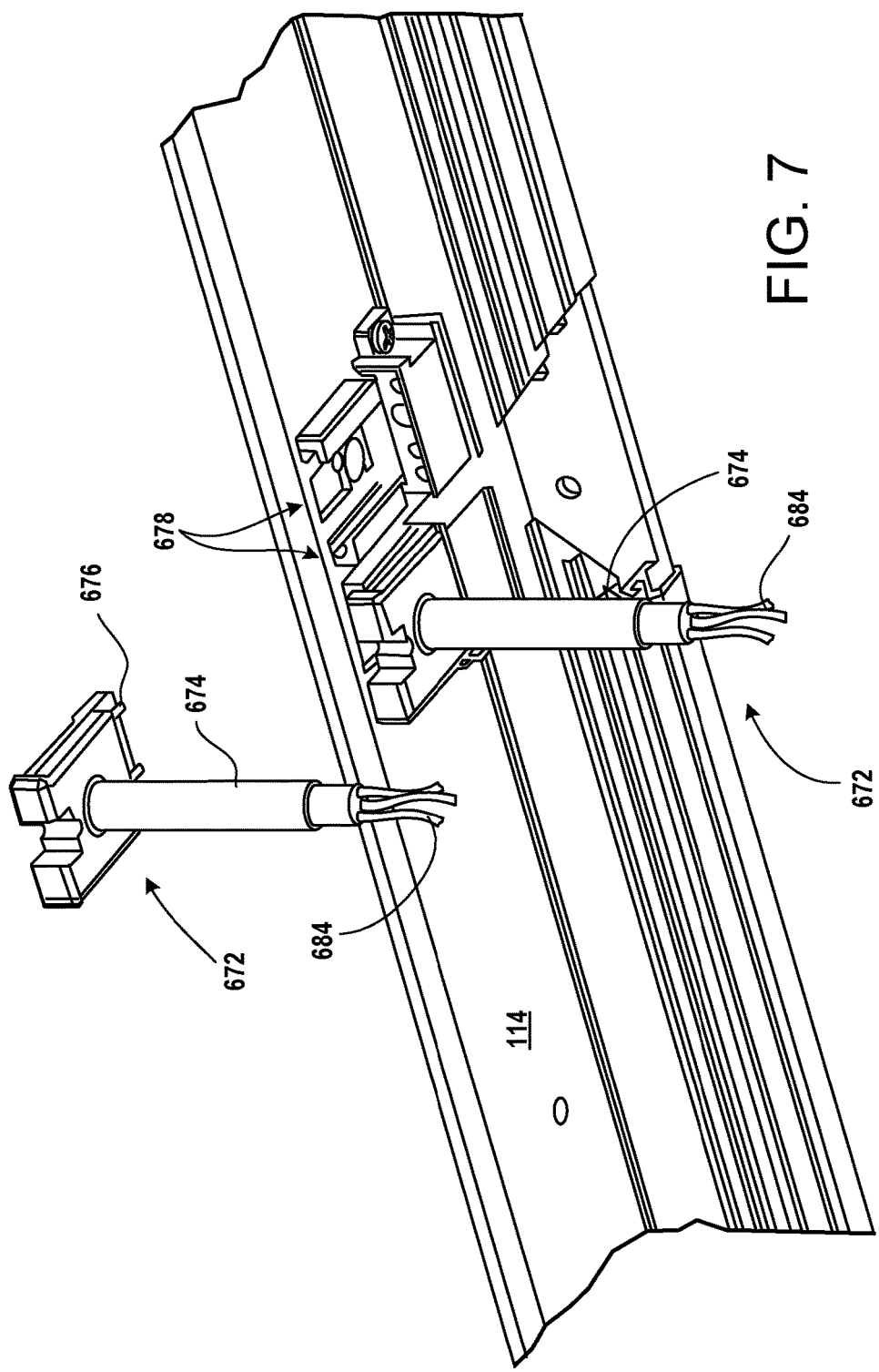
FIG. 7 is a perspective view drawing of two electrical hinge pins for use with the display case door assembly of FIG. 1, showing one of the hinge pins exploded away from a female connector.

With reference to FIGS. 6 and 7, as discussed above, the door assembly 110 includes an electrical or plug in hinge pin 670 at its top and/or bottom. For example, electrical hinge pin 54 can be that taught in U.S. Pat. No. 4,671,582 (referred to herein as "the '582 patent"), the entirety of which is incorporated herein by reference. As shown in FIG. 7, the components identified as the combined plug-in hinge pin and double-ended electrical plug assembly 672, hinge pin part 674, male contact pin members 676, and female connector assembly 678 are numbered items 30, 36, 52, and 90 of the '582 patent.

In some implementations, there is a gap 680 between the top of door frame 116. As shown in FIG. 6, gap 680 is more specifically between door frame 116 and reinforcing member 682 (part of the male connection portion of electrical hinge pin 670). Gap 680 allows door 112 to travel up and down as a result of the cam action of gravity hinge 602.

As shown in FIG. 6, electrical hinge pin 670 includes a hinge pin part 674 that extends downwardly into the top opening of hinge channel 406. Therefore, hinge pin part 674 and hinge pin 614 are coaxial (as a result of both extending into hinge channel 406) and allow door 112 to pivot. Hinge pin part 674 houses insulated conductors 684 that extend out of the bottom of hinge pin part 684 and into hinge channel 406. As shown in FIG. 4, which is a cross section of door 112, frame 116 includes a pathway 412 defined therein that provides path for wires 311 to pass from the hinge channel 406 and connect to the bus bar electrode 340. For implementations in which panel assembly 120 is powered, power can run from a wall outlet or the like, through wiring hidden in case frame 114, through electrical hinge pin 670 down wires 311 extending down hinge channel 406, through the conductor pathway 412, to connect to the bus bar electrode (s) 340. The bus bar electrodes 340 are connected to bus bars 309 to provide power to the electrically conductive coating 308. In this arrangement, all the wires necessary to provide power to the electrically conductive coating 308 can be hidden from view of a consumer.

The elements and assemblies discussed herein may be constructed from any of a wide variety of materials that provide sufficient strength or durability, in any of a wide variety of colors, textures, and combinations. Further, elements shown as integrally formed may be constructed of multiple parts or elements.

As used herein, the terms "approximately," "about," "substantially," and similar terms are intended to have a meaning consistent with the common and accepted usage by those of ordinary skill in the art to which the subject matter of this disclosure pertains. For example, the use of such terms indicates values or measurements that are within acceptable engineering, machining, or measurement tolerances within the art. Accordingly, these terms should be interpreted as indicating that insubstantial or inconsequential modifications or alterations of the subject matter described and claimed are considered to be within the scope of the invention as recited in the claims.

It should be noted that the orientation of various elements may differ according to other exemplary implementations, and that such variations are intended to be encompassed by the present disclosure.

While a number of examples have been described for illustration purposes, the foregoing description is not intended to limit the scope of the invention, which is defined by the scope of the appended claims.

What is claimed is:

1. A refrigerated display case door glass panel assembly, comprising:
  a vacuum-insulated glass (VIG) panel assembly comprising two panes of glass bounding a sealed evacuated space between the panes;

an additional pane of glass laminated across one of the panes of glass of the VIG panel assembly to form a refrigerator side of the door; and an electrically conductive coating disposed between the VIG panel assembly and the additional pane of glass, the coating extending across at least a majority of a viewing area of the door and connected to an electrical conduit for electrically heating the coating, for applying heat across the viewing area between the VIG panel assembly and the additional pane of glass.

2. The assembly of claim 1, further comprising a frame around a periphery of the assembly with hinge points along one edge of the frame.

3. The assembly of claim 1, wherein at least one of the two panes of glass of the VIG panel assembly comprise tempered glass.

4. The assembly of claim 1, wherein the electrically conductive coating is a high power coating capable of operating above 30 V RMS or 60 V DC.

5. The assembly of claim 1, wherein the additional pane of glass is laminated across one of the panes of glass of the VIG panel using a laminating layer selected from the group consisting of polyvinyl butyral (PVB), ethylene-vinyl acetate (EVA), polyethylene-vinyl acetate (PEVA), or thermoplastic polyurethane (TPU).

6. The assembly of claim 1, wherein the electrically conductive coating extends across essentially all of the viewing area.

7. The assembly of claim 1, comprising a gap between an edge of the electrically conductive coating and an edge of the panel assembly.

8. The assembly of claim 1, comprising first and second bus bars, the first bus bar connected to the electrically conductive coating at a first end of the electrically conductive coating and the second bus connected to the electrically conductive coating at a second end of the electrically conductive coating, the second end being spaced from the first end.

9. A refrigerated display case door, comprising:
a glass panel assembly comprising:
a vacuum-insulated glass (VIG) panel assembly comprising two panes of glass bounding a sealed evacuated space between the panes;
an additional pane of glass laminated across one of the panes of glass of the VIG panel assembly to form a refrigerator side of the door; and
an electrically conductive coating disposed between the VIG panel assembly and the additional pane of glass, the coating extending across at least a majority of a viewing area of the door and connected to an electrical conduit for electrically heating the coating, for applying heat across the viewing area between the VIG panel assembly and the additional pane of glass; and
a frame around a periphery of the glass panel assembly.

10. The door of claim 9, wherein the frame comprises a hinge channel extending through one side of the frame, the hinge channel housing wiring connected to electrically conductive coating.

11. The door of claim 10, comprising first and second bus bars, the first bus bar connected to the electrically conductive coating at a first end of the electrically conductive coating and the second bus connected to the electrically conductive coating at a second end of the electrically conductive coating, the second end being spaced from the first end, and
wherein the wiring is connected to the first and second bus bars.

12. The door of claim 9, wherein at least one of the two panes of glass of the VIG panel assembly comprise tempered glass.

13. The door of claim 9, wherein the electrically conductive coating is a high power coating capable of operating above 30 V RMS or 60 V DC.

14. The door of claim 9, further comprising a handle attached to the frame and arranged to extend outwards from a customer side of the door.

15. The door of claim 9, wherein the electrically conductive coating extends across essentially all of the viewing area.

16. The door of claim 9, comprising a gap between an edge of the electrically conductive coating and an edge of the panel assembly.

17. A refrigerated display case, comprising:
a plurality of doors mounted in an opening of the display case, each of the plurality of doors comprising:
a glass panel assembly comprising:
a vacuum-insulated glass (VIG) panel assembly comprising two panes of glass bounding a sealed evacuated space between the panes;
an additional pane of glass laminated across one of the panes of glass of the VIG panel assembly to form a refrigerator side of the door; and
an electrically conductive coating disposed between the VIG panel assembly and the additional pane of glass, the coating extending across at least a majority of a viewing area of the door and connected to an electrical conduit for electrically heating the coating, for applying heat across the viewing area between the VIG panel assembly and the additional pane of glass; and
a frame around a periphery of the glass panel assembly.

18. The display case of claim 17, wherein the frame of each of the plurality of doors comprises a hinge channel extending through one side of the frame, the hinge channel housing wiring connected to electrically conductive coating.

19. The display case of claim 18, wherein the panel assemblies of each of the doors comprises first and second bus bars, the first bus bar connected to the electrically conductive coating at a first end of the electrically conductive coating and the second bus connected to the electrically conductive coating at a second end of the electrically conductive coating, the second end being spaced from the first end, and
wherein the wiring of each door is connected to the respective first and second bus bars.

20. The display case of claim 17, wherein the glass panel assemblies of each of the doors comprises a gap between an edge of the electrically conductive coating and an edge of the panel assembly.

* * * * *